(12) United States Patent
Chen

(10) Patent No.: US 6,717,324 B2
(45) Date of Patent: Apr. 6, 2004

(54) MAGNET MOTOR DEVICE

(76) Inventor: Ming Yan Chen, P.O. Box 82-144, Taipei (TW)

(*) Notice: Subject to any disclaimer, the term of this patent is extended or adjusted under 35 U.S.C. 154(b) by 58 days.

(21) Appl. No.: 09/976,003

(22) Filed: Oct. 15, 2001

(65) Prior Publication Data

US 2003/0071537 A1 Apr. 17, 2003

(51) Int. Cl.[7] .......................... H02K 1/28; H02K 21/12
(52) U.S. Cl. ............ 310/268; 310/156.19; 310/156.32; 310/156.38; 310/156.44; 310/254
(58) Field of Search ................ 310/216, 254, 310/268, 156.19, 156.32, 156.38, 156.44, 68 R, 68 B

(56) References Cited

U.S. PATENT DOCUMENTS

| | | | | |
|---|---|---|---|---|
| 4,996,457 A | * | 2/1991 | Hawsey et al. ............. | 310/268 |
| 5,977,684 A | * | 11/1999 | Lin ............................. | 310/268 |
| 5,982,070 A | * | 11/1999 | Caamano .................... | 310/216 |
| 6,373,162 B1 | * | 4/2002 | Liang et al. ............ | 310/156.53 |
| 6,605,883 B2 | * | 8/2003 | Isozaki et al. ............ | 310/49 R |

* cited by examiner

Primary Examiner—Tran Nguyen
(74) Attorney, Agent, or Firm—Leong C. Lei

(57) ABSTRACT

The present invention relates generally to a magnet motor, and having being provided the driven power of the electro-magnet motor for electric vehicles, wherein, it has provided with a wireless coil whole rotator, which the upper part has been constructed with an equal angle, a power perpetual magnet is provided. At least one set of a magnet pole coil is formed into an electromagnet pole module and a circuit control unit. Using the perpetual magnet and the less electricity consumption of an electric magnet pole generates the repelling torque, accomplishing the object of the turning rotator to generate power. Either it is coupled with a simple or a complex structure; it can apply to be the driven motor of a bicycle, a motorcycle and a car. Moreover, it can greatly reduce the consumption of the vehicle battery electricity, and make it to be an environmental protection and practical vehicle means.

3 Claims, 13 Drawing Sheets

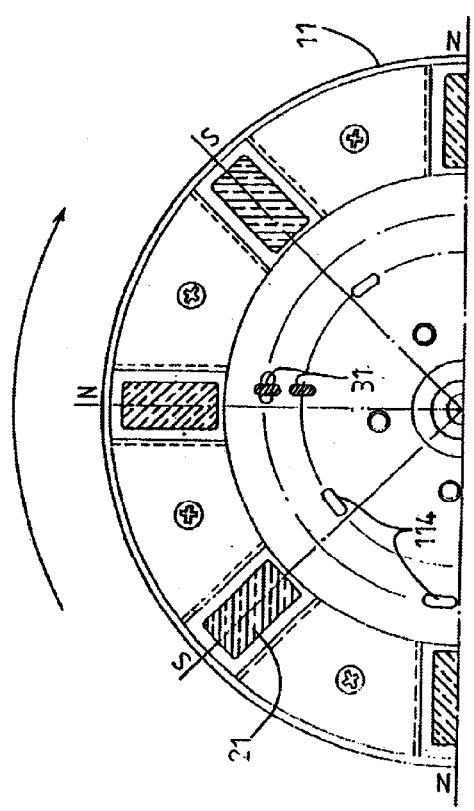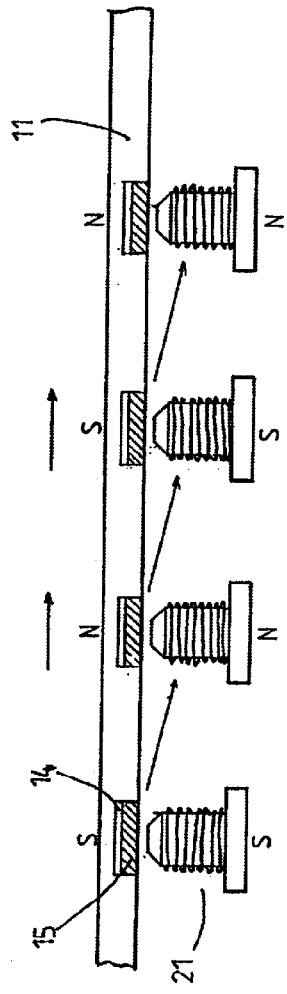
FIG. 5a
FIG. 5b

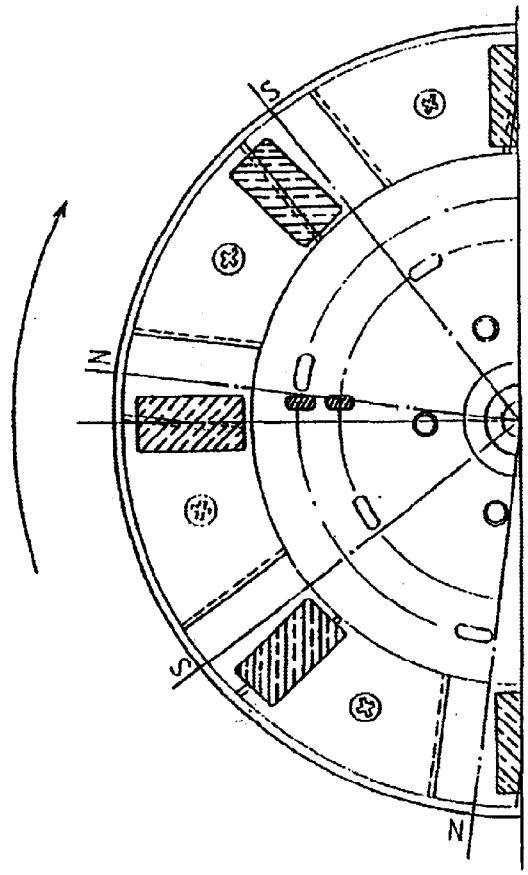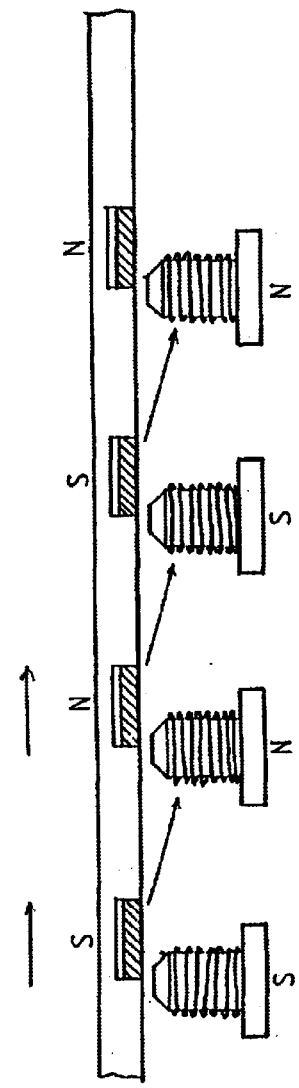
FIG. 6a
FIG. 6b

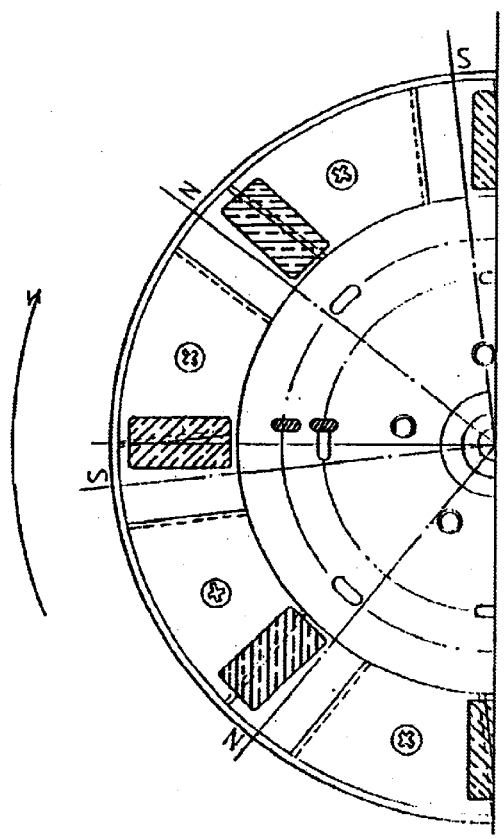
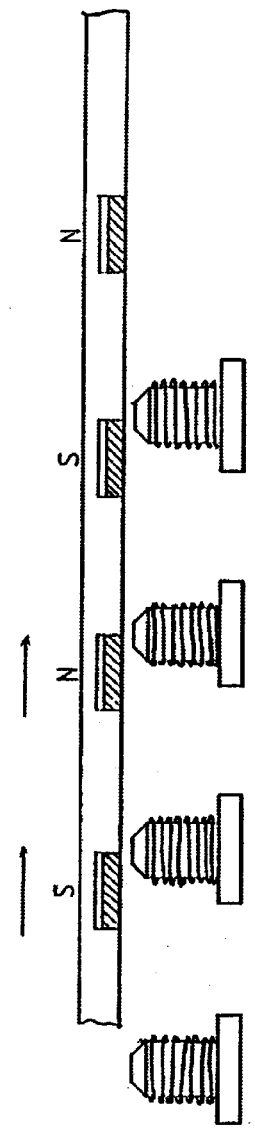
FIG. 7a
FIG. 7b

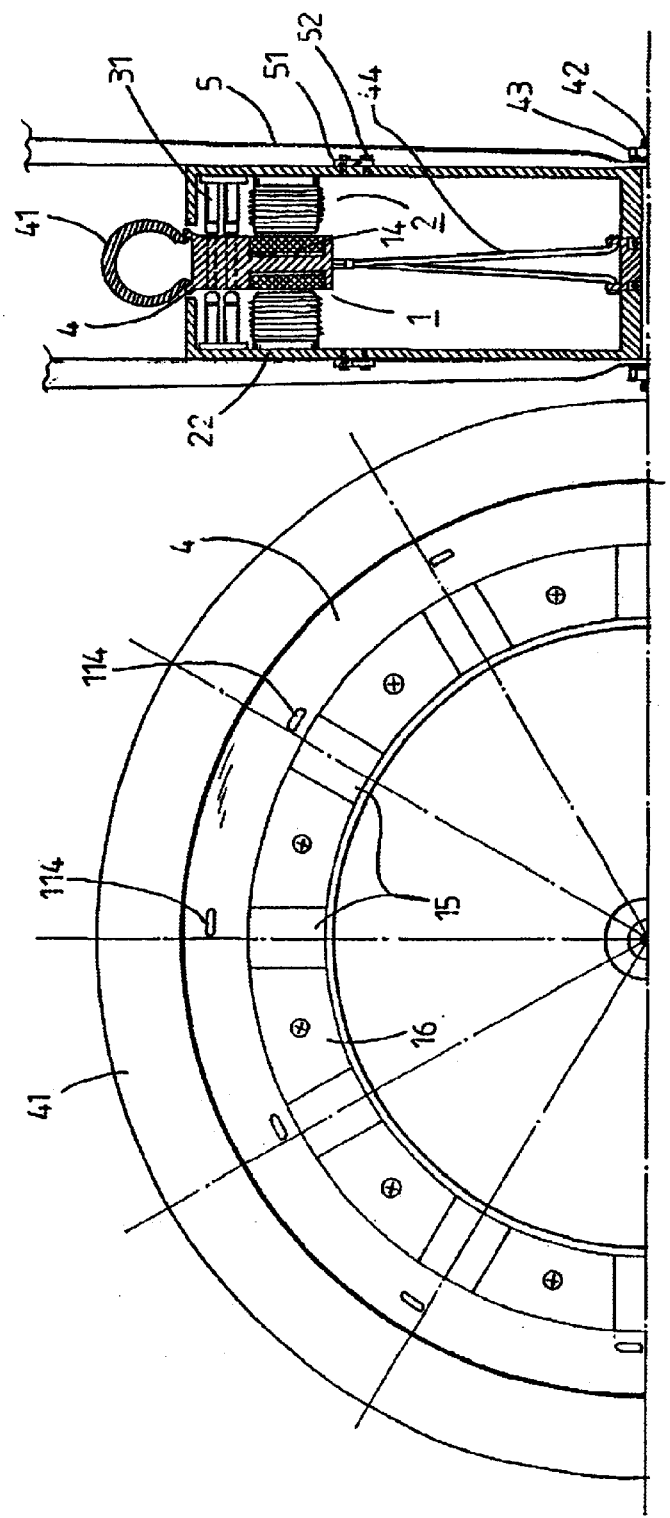

MAGNET MOTOR DEVICE

BACKGROUND OF THE INVENTION a. Field of the Invention

The present invention relates generally to a magnet motor device, and in particular, a magnet motor, which generates the driven power for electric vehicles.

b. Brief Description of the Prior Art

The current electric vehicles are mainly divided into an electric bicycle, an electric motorcycle and an electric car, and their power sources are generally from batteries supplied to electric motors by turning the driven vehicles moving forward. But these used to electric motors having their disadvantages are mentioned in the following:

1. The rotation of the electric motor the change can be achieved with the battery supplied electricity size. Therefore, in the condition of rapid drive for longer hours, it definitely increases the battery electricity consumption rate, and relatively, the vehicle will tend to continue drive in a shorter period.
2. In order to increase the continuous driving power of the vehicle, there shall require loading two or more batteries, and unintentionally, it not only increases the load of the vehicle, but also increases the consumption of the battery electricity.

SUMMARY OF THE INVENTION

The present invention relates generally to a magnet motor, and having being provided with the driven power of the electromagnet motor for electric vehicles, wherein, it has provided with a wireless coil rotator. Using the structure of a power perpetual magnet and the less electricity consumption of an electric magnet pole generate the repelling torque, accomplishing the object of the turning rotator to generate power. Either it is coupled with a simple or a complex structure; it can apply to be the driven motor of a bicycle, a motorcycle and a car. Moreover, it can greatly reduce the vehicle battery electricity consumption, and make it to be an environmental protection and practical vehicle means.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 5a, 5b are the action flow chart schematic views of the present invention.

FIGS. 6a, 6b are the action flow chart schematic views of the present invention.

FIGS. 7a, 7b are the action flow chart schematic views of the present invention.

FIG. 9a is the allocation schematic view of the site probe hole and the perpetual magnet of the first preferred embodiment of the present invention.

FIG. 9b is the partially sectional structure schematic view of the first preferred embodiment of the present invention.

FIG. 11b is the partial structure schematic view of the transmission clutch gear for the FIG. 11a.

DETAILED DESCRIPTION OF THE PREFERRED EMBODIMENT

Figure 1:
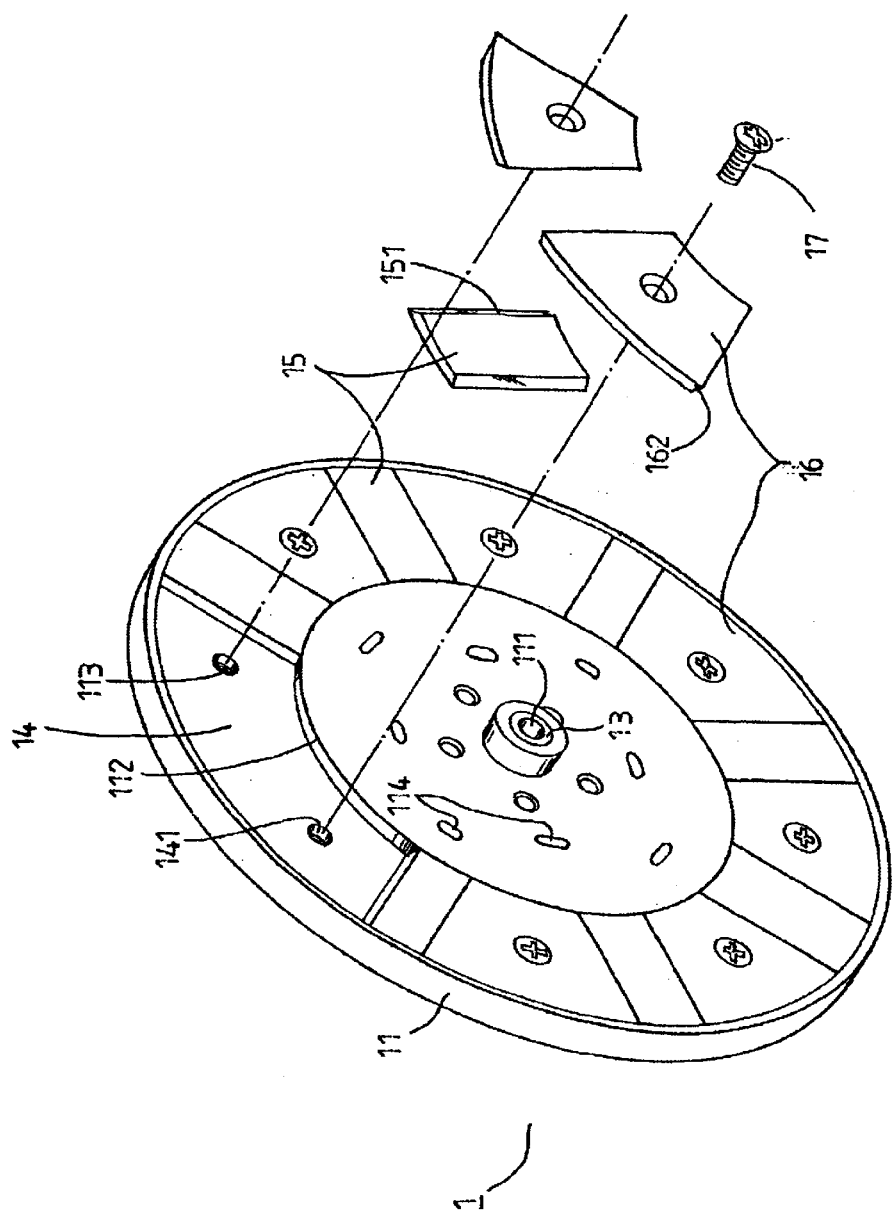
FIG. 1 is the assembly schematic view of the whole rotator.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, alterations and further modifications in the illustrated device, and further applications of the principles of the invention as illustrated herein being contemplated as would normally occur to one skilled in the art to which the invention relates.

The present invention relates generally to a magnet motor of an electric vehicle, comprising a whole rotator 1, an electric magnet pole module 2, and a circuit control unit 3.

Figure 3C:
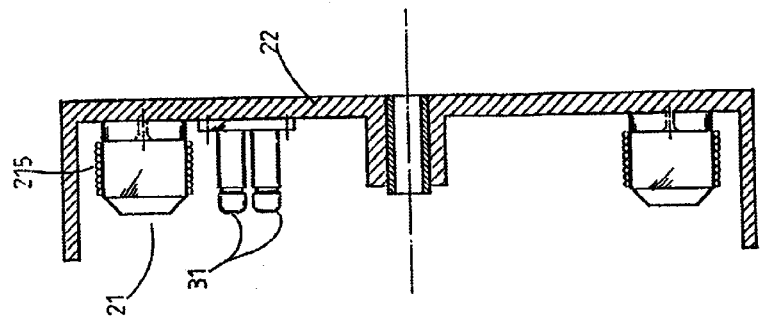
FIG. 3c is the site relation view of the electromagnet pole module and their relative components.
Figure 3B:
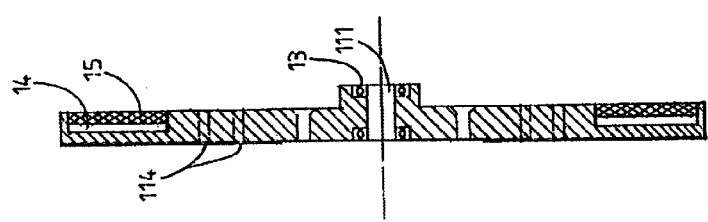
FIG. 3b is the perspective exploded view of the whole rotator.
Figure 3A:
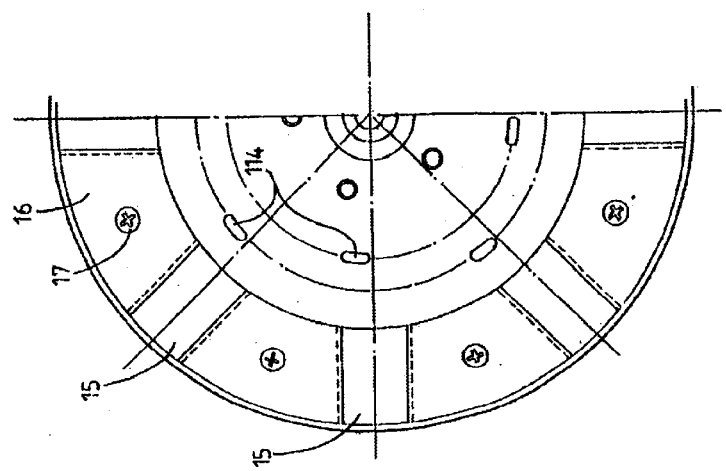
FIG. 3a is the sectional perspective exploded view of the whole rotator.
Figure 4:
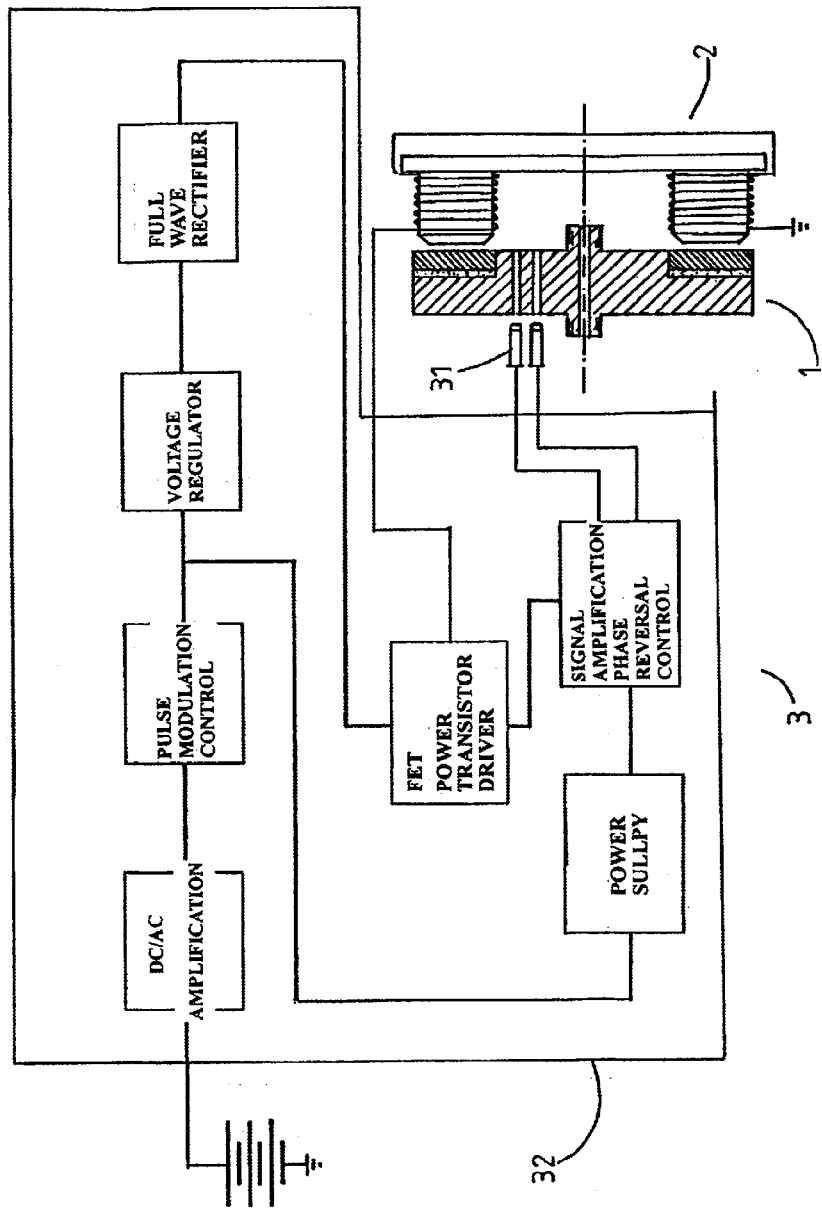
FIG. 4 is the control flow chart of the circuit controller.

The whole rotator 1, (refer to FIGS. 1, 3a, 3b), has constructed with a circular disc housing, having more than one set equal angle of the perpetual magnets are provided. The circular disc housing acts as a turning disc 11 for turning; at the center part, a center axle 12 is provided to pass through a through hole 111, and both sides of the through hole 111, an axle bearing 13 is provided separately. Along an outer ring of the turning disc 11, a ring recess 112 is drilled with a round inner cavity; a conductive magnet board 14 is mounted on and left with an appropriate depth. The conductive magnet board 14 on its equal angle location is drilled with plurality of a bore hole 141 uprightly to the main housing of the turning disc 11 and become a blind hole, and the internal screws threads 113 are mounted separately. On the conductive magnet board 14, they have more than one set N poles and S poles of perpetual magnets are mounted, which in the array manner of adjacent opposite poles and correspondent it poles. A pressing board 16 is pressed in between two opposite pole magnets, and a stud 17 will pass through a through hole 161 of the pressing board 16 and screw to the internal screw thread 113 of the turning disc 11, and a perpetual magnet 15 is fastened. Perpetual magnets are divided into an N pole and an S pole, which the shape of both sides is in parallel; shapes of the top and bottom are coincided with the ring recess 112. The lateral shape is from the top downwards to the decline of an exact slant side 151, and the shape of the N pole magnet and the size of the thickness are larger than the S pole magnet. The above-mentioned shape of the pressing board 16 is like a fan, shapes of the top and bottom are coincided with the ring recess 112. Both sides of the left and right are closed with shapes of both opposite pole magnets; the lateral shape is from the top downwards to the decline of an opposite slant side 162. As those pressing boards 16 are set to press each magnet, the whole ring recess 112 will be totally filled up. Other, (refer to FIGS. 3a, 3b), on the lower part of each magnet, and the shape on the same side of the symmetry line, a site probe hole 114 is provided to pass through the turning disc 11. A N pole probe hole and a S pole probe hole are separately arrayed on the different of the concentric circles, and the length of each site probe hole is started from the edge of the extension line of the perpetual magnet and finished before the symmetry line of the perpetual magnet.

Figure 2:
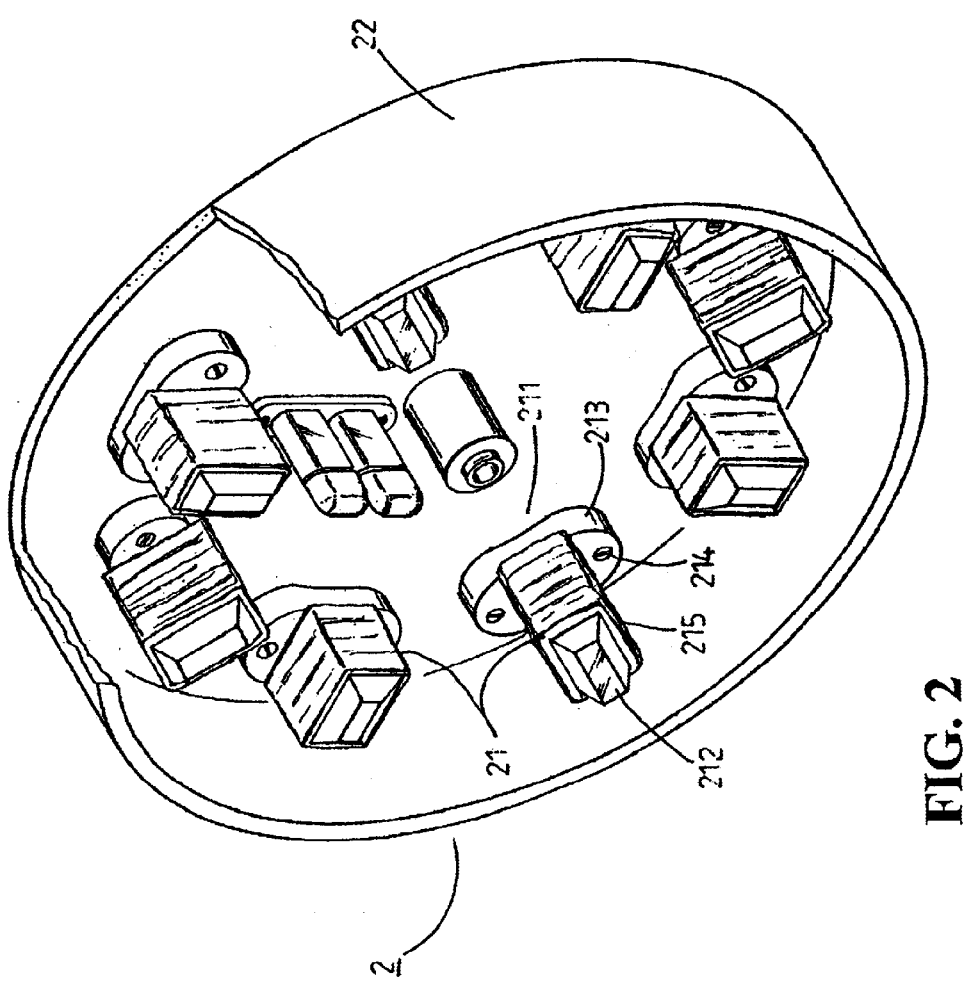
FIG. 2 is the assembly schematic view of the electromagnet pole module.

An electric magnet pole module 2, (refer to FIGS. 2, 3c), is a combination with plurality of a magnet pole coil 21 generating magnet poles. The magnet pole coil 21 is mainly comprised with the combination of a high conductive magnet ceramic or a high conductive silicone steel piece of a conductive magnet coil seat 211. The shape of an end portion 212 of the conductive magnet coil seat 211 is retracted towards to the center; a seat housing 213, a screw hole 214 is provided. And then again, the conductive coil seat 211 in the same direction is wrapped with a varnish cover thread 215 and become a magnet pole coil 21. The magnet pole coil 21 with the same plurality of the perpetual magnet 15, having an equal angles are mounted with a shell housing 22, and letting each magnet pole 21 is precisely corresponding to the perpetual magnet 15. The mentioned shell housing 22 is round cover housing, is provided with the cover protection of the whole rotator 1. Besides, those magnet pole coils 21 are screwed mounting and also fixed at the support.

A circuit control unit 3, comprises a site sensor 31 and a circuit controller 32, wherein, the site sensor has two units, which are located separately at a site probe hole 114, and set in array to form into two concentric circles in front, (in FIG. 5a). When the site sensor 31 is in face of the geometry center of the site probe hole 114, the magnet pole coil 21 will face to the perpetual magnet 15. The loops of the site sensor 31 and the magnet pole coil 21 are all connected to the circuit controller 32, where it controls the whole management.

Figure 8A:
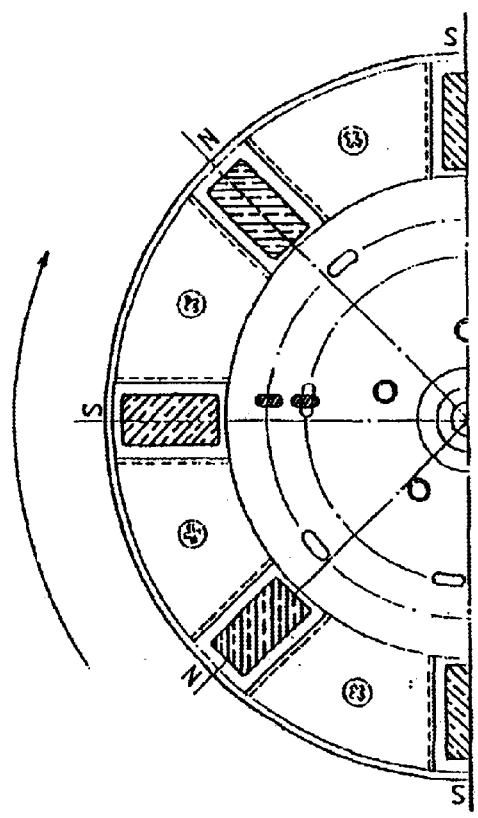
FIGS. 8a, 8b are the action flow chart schematic views of the present invention.
Figure 8B:
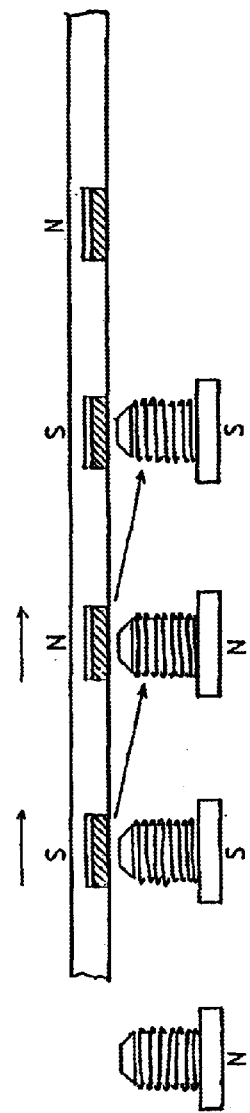

After the above-mentioned components have been assembled, assuming that the external circle of the site probe hole 114 has become a site probe hole of a N pole magnet, and the internal circle of the site probe hole 114 has become a site probe hole of a S pole magnet. When the site sensor 31 is in face of the N pole site probe hole 114, the upper part and the magnet pole coil 21 that face to the perpetual magnet will become the N pole perpetual magnet. As the motor current is switched on, the circuit controller 32 will be given out a weak voltage, allowing the magnet pole coil 21 to generate the magnetic polarity, and the opposite pole of the perpetual magnet will approach to get the position, (in FIGS. 5a, 5b). While the whole rotator 1 is being got the position, when the electric door is switched on, it will transmit the normal working voltage. If the site sensor detects the present front is the N pole magnet, at this instance; the front of the magnet pole coil 21 of all N poles will generate magnetic N poles. Meanwhile, the front of the magnet pole coil 21 of the S pole magnets will generate magnetic S poles, allowing the magnetism of the magnet pole coil 21 and the perpetual magnet are inter repelling, and drive the whole rotator in turning, (in FIGS. 6a, 6b). When the site sensor 31 is exceeding the site probe hole 114 range, the circuit controller 32 will stop supply voltage to each magnet pole coil, using the magnetism residue of the utmost coil can attract the whole rotator for continuous turning, (refer to the FIGS. 7a, 7b). When the site sensor 32 is entered into the site probe hole 114 range, detects the nearby perpetual magnet as a S pole magnet, the circuit controller 32 will then push the reverse voltage away to each pole magnet coil. Due to the relation in voltage delay, at this instance, the magnetism of the magnet pole coil has still not yet completed, (refer to the FIGS. 8a, 8b). As long as the perpetual magnet reaches to the front of the magnet pole coil, then all S pole magnets to the front of magnet pole coils 21 will generate the electromagnetism of their polarities. All N pole magnets to the front of magnet pole coils 21 will generate magnetic N poles, and as both are under inter repelling, the whole rotator will be in continuous turning again. Under the condition of polarities of magnet pole coils are interchangeable and inter action with perpetual magnets, the whole rotator shall be in continuously action and increasingly it tuning velocity. When the turning velocity is being reached to a certain velocity of the whole rotator, the circuit controller 32 will instruct one of site sensors 31 to stop work. If only the N pole site sensor 31 is working, the N pole perpetual magnet will come close, only then the supply voltage of the magnet pole coil is relative to the N pole magnet, and pushes away the N pole magnet to facilitate turning. While the electric door is switched off, the circuit controller 32 will stop supply the normal working voltage, and transmits a micron fixed voltage of the same poles, which attracts the opposite pole of the perpetual magnet coming close to set the position.

The preferred embodiment of the present invention for the bicycle structure in FIGS. 9a, 9b, comprising a wheel case 4, as a component of a whole rotator 1, in which the same structure shall has at least one set N pole and S pole of a perpetual magnet 15 thereto. A pressing board 16 is mounted on a conductive magnet board 14, and on the upper part of each magnet and the shape on the same side of the symmetry line, a N pole and S pole of a site probe hole 114 is provided to pass through the wheel case 4. They are separately arrayed on the different of the concentric circles, and the length of each site probe hole is started from the edge of the extension line of the perpetual magnet and finished before the symmetry line of the perpetual magnet. As to increase power, both sides of the wheel case, a set of an electromagnet pole module 2 is separately mounted (in FIG. 9b), and a wheel axle center 42 that pass through the electromagnet pole module 2 of a shell housing 22, a screw nut 43 is fastened at both ends. A bolt seat 51 is protruded out from a support 5, in which a bolt 52 can pass through and screw on the shell housing 22. A circuit controller 32 controls all current directions of a site sensor 31 and the electromagnet pole module 2. Besides, it structure can mount either with a front or a rear wheel.

Figure 10A:
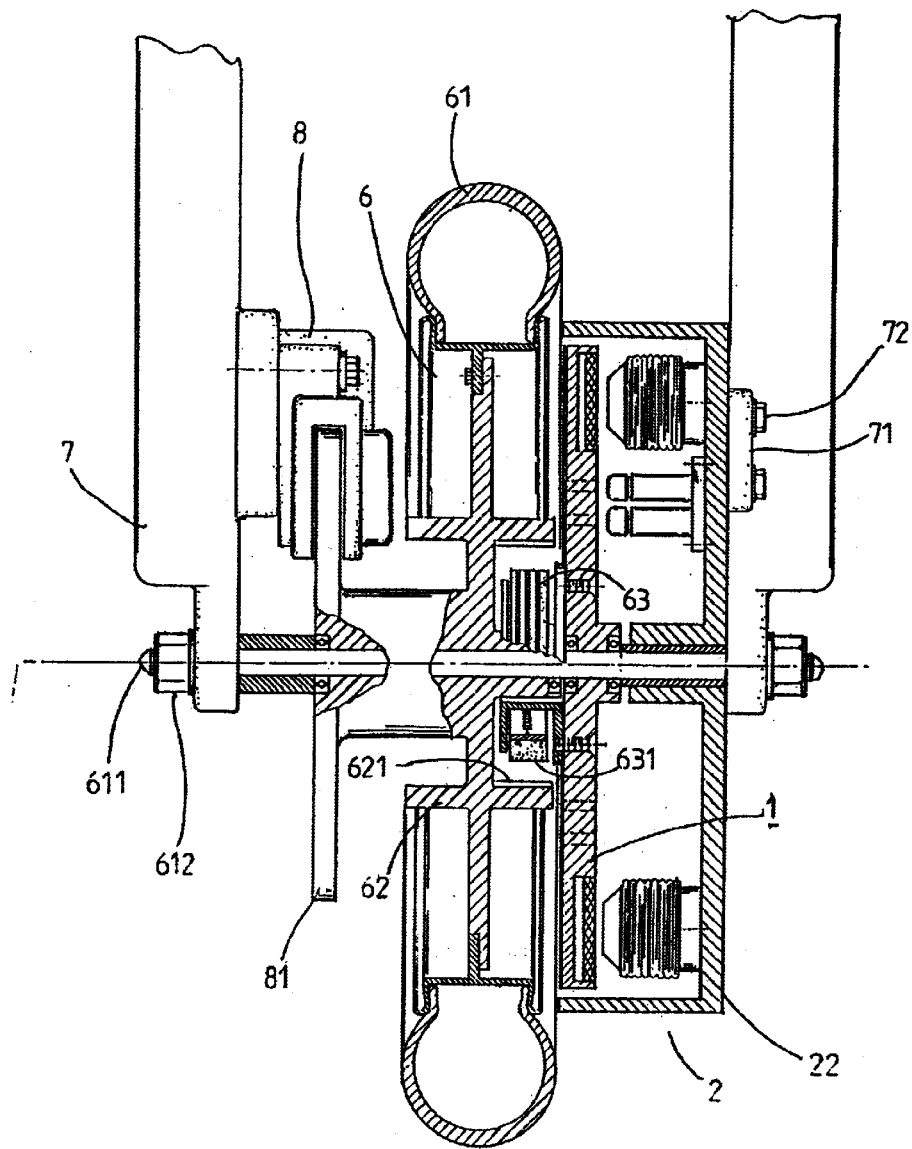
FIG. 10a is the allocation schematic view of the plate type triggering apparatus and its relative components of the second preferred embodiment of the present invention.
Figure 10B:
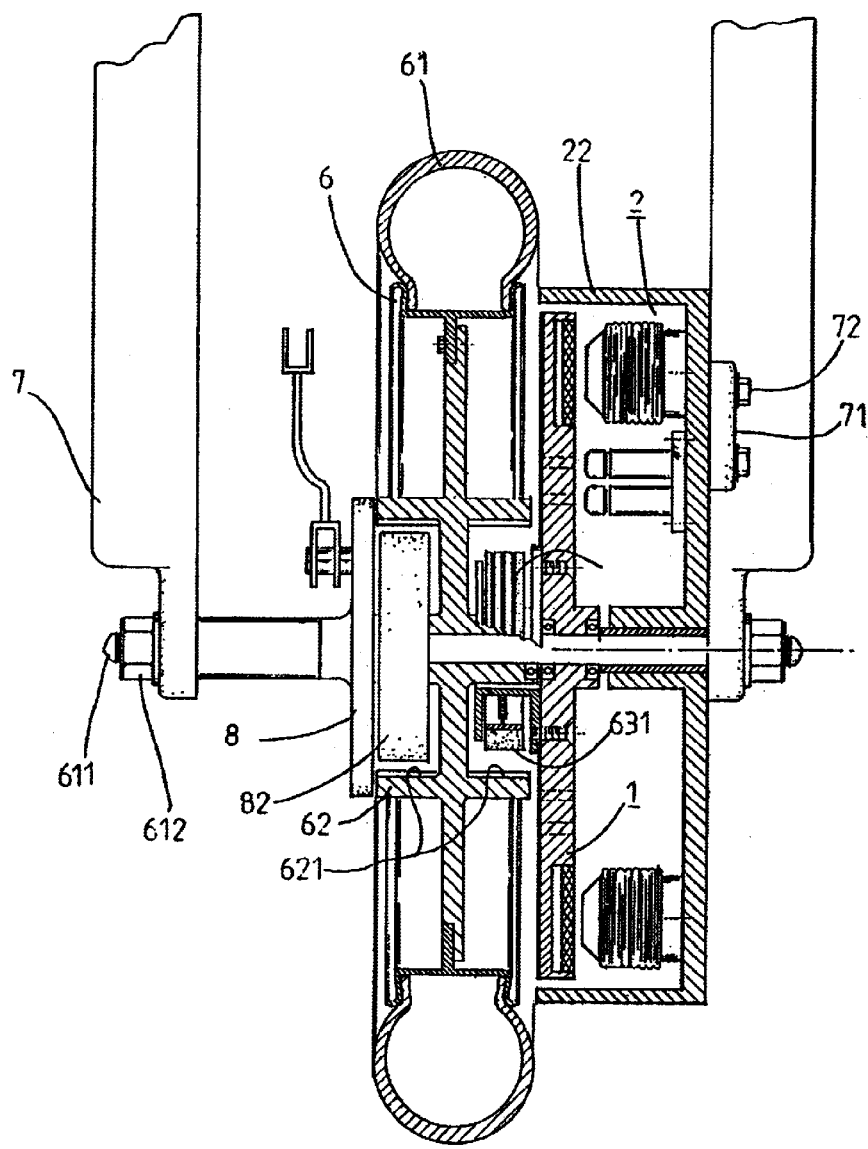
FIG. 10b is the allocation schematic view of the drum type triggering apparatus and its relative components of the second preferred embodiment of the present invention.

As shown in FIGS. 10a, 10b, having being another preferred embodiment of the present invention for the motorcycle, wherein, is comprised a wheel case 6, an external ring as a tire 61, a wheel drum center 62 is divided into two half portions, and the inner face of the wheel drum, a good resistant material of a friction face 621 is provided. A clutch 63 is mounted with a whole rotator 1, and near one side of the wheel drum 62, which is placed into the wheel drum. A triggering apparatus 8 can either be a plate type (FIG. 10a) or a drum type (10b). A wheel axle center 611 will follow the sequences pass through a support 7, an electromagnet pole module 2 of a shell housing 22, the whole rotator 1, the centrifugal clutch 63, the wheel drum 62, the triggering apparatus 8, and both ends of the support 7 are fastened with screw nuts 612, and it accomplishes the whole driving structure of the electromagnet motor. A bolt seat 71 is protruded out from a support 7, in which a bolt 72 can pass through and screw on the shell housing 22. While riding, as the electric door is switched on to transmit the normal working voltage, a certain velocity is being reached for the turning rate of the whole rotator 1, a friction piece 631 of the clutch 63 will be pushed out, the whole rotator 1 and the wheel drum 62 will couple and lead the tire moving forward, as to achieve the driven efficiency. A circuit controller 32 controls all current directions of a site sensor 31 and the electromagnet pole module 2. Besides, the above-mentioned structure can mount with a front or a rear wheel or both.

Figure 11B:
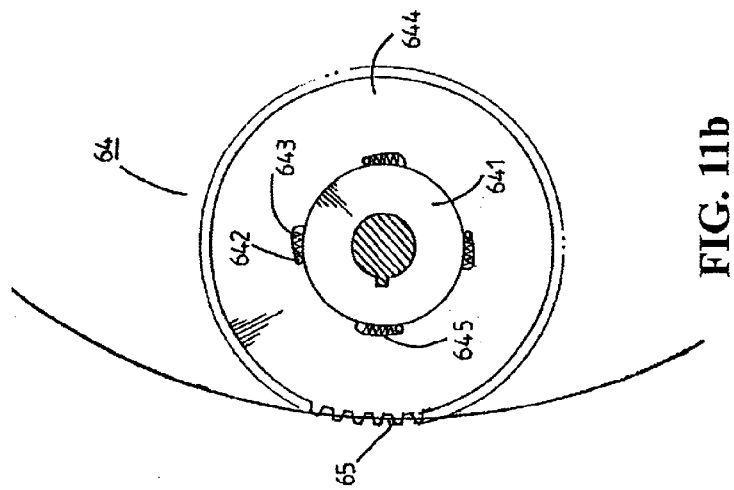
Figure 11A:
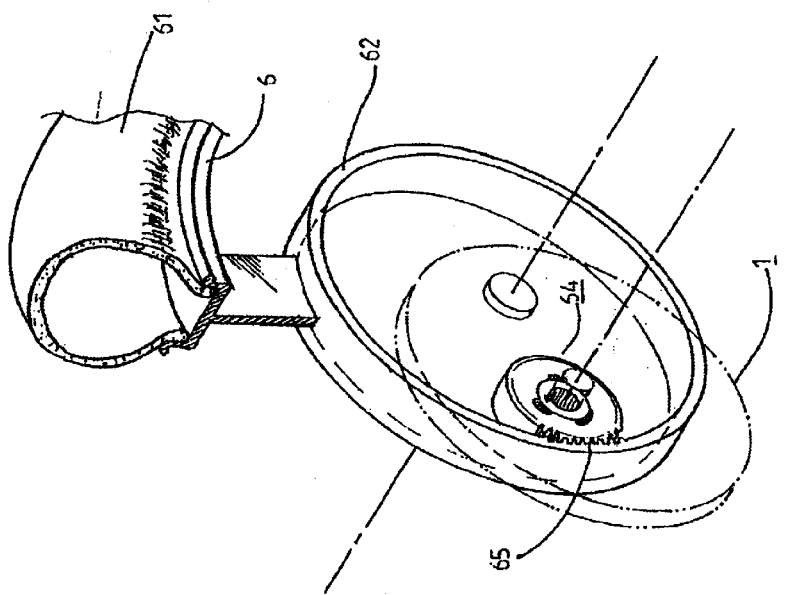
FIG. 11a is another type of the clutch assembly schematic view of the second preferred embodiment of the present invention.

As shown in FIGS. 11a, 11b, having being another preferred embodiment of a clutch installation, wherein, both axles center of a wheel case 6 and a whole rotator 1 are placed in a biased method. An inner ring of a wheel drum 62 of the wheel case 6, a parallel gear 65 is provided. At the end structure of the axle center of the whole rotator 1, a transmission clutch gear 64 is disposed, which is exactly coupled with an internal side of the parallel gear 65. A transmission gear 644, a plurality of dent holes 645 are provided, the dent hole 645 shape is formed into a small arc and a large arc; a cutting thread is mounted over. Those dent holes are placed in with a spring 643 and a round lock 642. When a sleeve tube 641 has been turned by the axle center of the whole rotator in anti-clockwise direction, due to the function of the friction force, the round lock 642 will has shifted to the small arc of the dent hole and generated a holding force, so that the axle center will has to lead its transmission gear 644. Otherwise, as the wheel drum 62 turning velocity is rapid than the transmission gear 644, the round lock 642 will shift towards to the large arc of the dent hole, and loss it holding force, the sleeve tube 641 and the transmission gear 644 will loss it connection and achieve the clutch effect.

Figure 12:
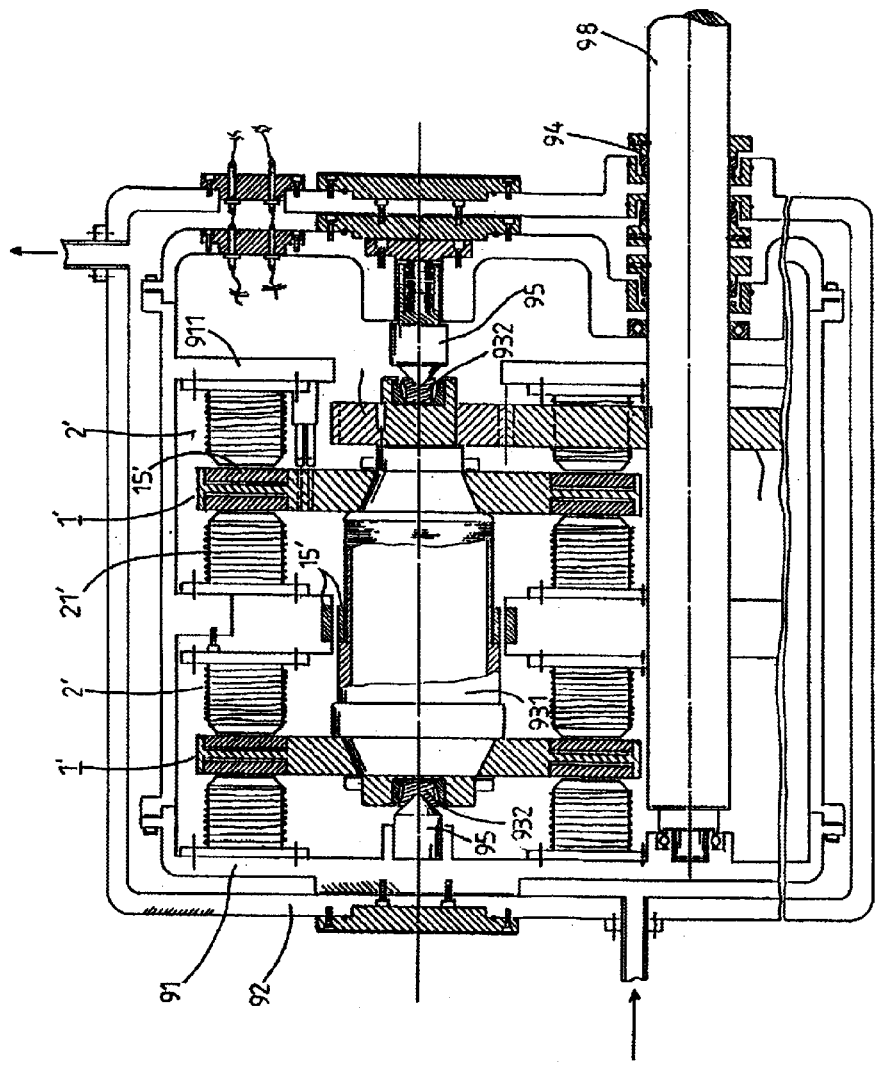
FIG. 12 is the structure schematic view of the third preferred embodiment.

As shown in FIG. 12, having being another preferred embodiment of the present invention for the car, as to reduce the magnet resistant coil and raise the electromagnetism of a magnet pole coil, and the coolant having being engaged as a medium auxiliary; wherein; is comprised an internal shell 92, a whole rotator 1, a electromagnet coil module 2 and a transmission mechanism, and other components are mounted inside. An external shell 92, an internal shell 91 is placed in the external shell and maintained a clear clearance. The coolant will flow into one end, and flow out from the other end, as to accomplish the object of reducing the internal components temperature of the internal shell 91, the outer part of the external shell has been covered with an insulation material, as to maintain the temperature and prevent to loss it easily. The above-mentioned of the whole rotator 1 is mounted at a rotating axle 931, both ends of the rotating axle 931; a stop push axle bearing 932 is provided. On the internal shell 91, a peak pin 95 is disposed, in which both ends are separately set in the position of the rotating axle 931 and it can be a free rotation. At the center of the rotating axle 931, a perpetual magnet ring is provided, and having the inter-repelling function with the same pole magnet of an internal shell extended housing 911. On the rotating axle 931, at least one set of the whole rotator 1 is provided. On the other both faces of the whole rotator 1, a perpetual magnet is disposed individually, at least one set of the electromagnet pole module 2 is constructed at the internal shell extended housing 911 and become a relative site to the perpetual magnet. The magnet pole coil 21 adjacent, it conductive magnet coil seat can form into a body. After the rotation of the rotating axle by the function of the magnet pole coil 21 and the perpetual magnet 15, the generating power will transmit from an active gear 96, which has constructed at one end of the rotating axle to a passive gear 97 of an output axle 98. The output axle will transfer out the power. Due to the coolant has beneficially increased the electromagnet efficiency, plus it can increase more sets of the electromagnet pole module and the whole rotator. Therefore, the preferred embodiment can produce a very good power, as to accomplish the object of the car power.

While the invention has been described with respect to preferred embodiment, it will be clear to those skilled in the art that modifications and improvements may be made to the invention without departing from the spirit and scope of the invention. Therefore, the invention is not be limited by the specific illustrative embodiment, but only the scope of the append claims.

I claim:

1. A magnet motor of an electric vehicle, comprising a whole rotator, an electric magnetic pole module, and a circuit control unit, wherein the whole rotator comprising:

a circular disc housing structure, more than one set of the permanent magnets being arranged at an equal angular spacing in said circular disc housing structure;

wherein:

the circular disc housing acts as a rotary turning disc; a through hole is provided at a center part thereof, a center axle passing through said through hole, and both sides of the through hole, an axle bearing is provided separately, along an outer ring of the rotary turning disc, an annular recess is drilled with a round inner cavity;

a conductive magnetic board is mounted on and located in said annular recess with an appropriate depth, said conductive magnetic board is drilled with plurality of bore holes at equal angular locations, said bore holes are uprightly to the main housing of the turning disc and become blind holes and internal screws threads are mounted separately, on the conductive magnet board, said more than one set north (N) pole permanent magnets and south (S) pole permanent magnets are mounted in an array manner of adjacent opposite poles;

a plurality of pressing boards, each is pressed in between two opposite pole magnets, and a stud securely pass through a through hole of the pressing board and screw to the internal screw thread of the turning disc to secure said permanent magnet in place on the annular recess, each of the permanent magnets are respectively configured with a shape having both circumferential sides is in parallel having top lateral side and bottom lateral side are coincided with the annular recess, and each of said permanent magnet having the top lateral shape is declined downwards to the bottom lateral side of an exact slant side;

each of said N-pole permanent magnets having a thickness greater than that of each of the S-pole permanent magnets, and each of said pressing board is configured with a fan shape with top side and bottom sides are coincided with the annular recess, and circumferential sides are corresponding to said circumferential side of both opposite pole magnets;

said fan shape of the pressing board having the top side is declined downwards to the bottom side of an opposite slant side of adjacent permanent magnets, the pressing boards are set to press each magnet to form a complete circular of alternately pressing boards and magnets, and the whole annular recess will be totally filled up with the respective pressing boards and magnets;

on the lower part of each magnet, and the shape on the same side of a symmetry line, a site probe hole is provided to pass through the turning disc, and N-pole probe hole and S-pole probe holes are in separately arrayed arrangement on the different concentric circles, and a length of each site probe hole is extended from an edge of an extension line of the permanent magnet and finished before the symmetry line of the permanent magnet;

said magnet motor of an electric vehicle further comprising:

an electric magnetic pole module having a plurality of poles in combination with plurality of magnet pole coils generates magnetic poles, each of the magnetic poles is mainly comprised with the combination of a high conductive magnet ceramic or a high conductive silicone steel piece of a conductive magnetic coil seat, and a shape of an end portion the conductive magnetic coil seats is ascent formed towards to a center thereof;

a shell housing wherein the shell housing is round cover housing, and is provided with the cover protection of the whole rotator;

each of the conductive coil seats, with magnetic pole coil, is wrapped with a varnish cover thread and become a magnetic pole coil; said magnetic poles are mounted in a the shell housing at an equal angular spacing; and each of said magnet poles is precisely corresponding to respective said permanent magnets, and the magnetic poles are screwed mounted in said shell housing and also fixed at a support thereof, and a circuit control unit, comprises a site sensor and a circuit controller, wherein, the site sensor has two units being located separately at a site probe hole, and are set in array to form into two concentric circles in front, and when the site sensor is facing a geometry center of the site probe hole, the magnetic poles facing corresponding permanent magnets, and loops of the site sensor and the magnetic poles are all connected to the circuit controller.

2. The magnet motor of an electric vehicle of claim 1, comprising a whole rotator, an electric magnet pole module, and a circuit control unit, wherein:

when the site sensor is facing the N pole site probe hole, the magnetic poles that facing corresponding permanent magnet will become the N pole, at the same time, when the site sensor facing S pole site probe hole, the magnetic pole coil that facing corresponding permanent magnet will become the S pole;

as the motor current is switched on, the circuit controller will be given out a predetermined voltage, allowing the magnet pole coil to generate the magnetic polarity, and the opposite pole of the permanent magnet will approach to get an corresponding position, while the whole rotator is being in predetermined position;

if the site sensor detects a present front is the N pole magnet, at this instance, fronts of the magnet pole coils of all N poles will generate magnetic N poles, meanwhile, fronts of the magnet pole coils of the S poles will generate magnetic S poles, allowing the magnetism of the magnet pole coils and the permanent magnets are inter repelling, and drive the whole rotator in rotary turning, when the site sensor is exceeding a predetermined range of the site probe hole, the circuit controller will stop supply voltage to each magnet pole coil, using the magnetism residue of an utmost coil can attract the whole rotator for continuous turning, when the site sensor is entered into the site probe hole range, and detects a nearby permanent magnet thereof as a the S pole magnet, the circuit controller will then push a reverse voltage away to each pole magnet coil, due to a relation in voltage delay, at this instance, the magnetism of the magnet pole coil has still not yet completed, and as long as the permanent magnet reaches to the fronts of the magnet pole coils, then all S pole magnets to the fronts of magnet pole coils will generate the electromagnetism of their S polarity, and all N pole magnets to the fronts of magnet pole coils will generate magnetic N poles, and as both the magnets and the magnetic poles are under inter repelling, the whole rotator shall be in continuous rotary turning, and under a condition of polarities of magnet pole coils are interchangeable and inter action with permanent magnets, the whole rotator will be in continuously action and increasingly rotary turning velocity, and when the rotary turning velocity is being reached to a predetermined velocity of the whole rotator, the circuit controller will instruct one of site sensors to stop working, if only the N pole site sensor is working, the N pole permanent magnet will come close, and only then the supply voltage of the magnet pole coil is relative to the N pole magnet, as to push away the N pole magnet to facilitate turning.

3. The magnet motor of an electric vehicle, comprising a whole rotator, an electric magnetic pole module, and a circuit control unit, wherein the whole rotator is located at a bicycle wheel case, at least one set north (N) pole and south (S) pole of permanent magnets is disposed in equal angle array onto a conductive magnetic board of the wheel case, and at least one pressing board is mounted on the conductive magnetic board, and said pressing board is located between each magnet of said permanent magnet set;

each of said permanent magnet is configured with a shape having symmetrical sides with respect to a symmetry line;

N-pole and S-pole of site probe holes are provided to pass through the wheel case, and are in separately arrayed arrangement on different concentric circles, wherein a length of each site probe hole is extended from a side of an extension line of the permanent magnet and finished before said symmetry line of the permanent magnet, as to increase power, both sides of the wheel case are respectively provided with a set of an electromagnet pole module separately mounted therein, a wheel axle center passing through the electromagnet pole modules of a shell housing, a screw nut is fastened at both ends thereof, and a bolt seat is protruded out from a support of the shell housing, wherein a bolt passing through and screwing on the shell housing; and, circuit controller controls all current directions of a site sensor and the electromagnet pole module, wherein said circuit controller is mounted either to a front side or a rear side of said bicycle wheel, wherein all loops of the site sensor and the electromagnet pole module are connected back to the circuit controller.

* * * * *